Dec. 3, 1957  R. W. DUNN ET AL  2,815,477
FREQUENCY CONTROLLING OR INDICATING DEVICES
Filed Aug. 3, 1953  5 Sheets-Sheet 2

R. W. DUNN
J. F. MEYER
INVENTORS

BY
ATTORNEY

Dec. 3, 1957   R. W. DUNN ET AL   2,815,477
FREQUENCY CONTROLLING OR INDICATING DEVICES
Filed Aug. 3, 1953   5 Sheets-Sheet 4

R. W. DUNN
J. F. MEYER
INVENTORS

BY
ATTORNEYS

Dec. 3, 1957 R. W. DUNN ET AL 2,815,477
FREQUENCY CONTROLLING OR INDICATING DEVICES
Filed Aug. 3, 1953 5 Sheets-Sheet 5

R. W. DUNN
J. F. MEYER
INVENTORS

BY Moore & Hall
ATTORNEYS

United States Patent Office 2,815,477
Patented Dec. 3, 1957

2,815,477

FREQUENCY CONTROLLING OR INDICATING DEVICES

Reginald William Dunn and John Francis Anthony Meyer, Hillington, Glasgow, Scotland, assignors to Kelvin & Hughes Limited, Hillington, Glasgow, Scotland Application August 3, 1953, Serial No. 371,924

Claims priority, application Great Britain August 7, 1952

14 Claims. (Cl. 318—341)

This invention relates to frequency devices, i. e. devices adapted to operate at a suitable frequency e. g. electrical or mechanical oscillations.

The main object of the invention is to enable such a device to have an output frequency which can be varied as required by the operator and can be used for example as a standard for comparison with an engine speed whereby the engine speed can be measured.

For example, the drequency device may operate an electric motor at a speed which is variable by the operator and the speed of this motor may be compared with the speed of an engine by means of a differential gear; the operator will adjust the frequency device until its frequency is equal to the speed of the engine and thereby measure the speed of the engine.

According to the invention a resilient mechanical oscillatory system is provided in combination with electromagnetic input means for maintaining it in oscillation and output means for deriving an alternating electric current the alternations of which are controlled by the oscillations of said system, means being provided whereby the operator can vary the natural periodicity of the system over a given range.

The oscillatory system will oscillate at its natural frequency or in certain cases at a nodule frequency e. g. one half or one quarter of the natural frequency. A mechanical resilient system has a strong tendency to maintain its frequency of oscilliations at its natural frequency (or a nodule ratio thereof) in spite of small variations in the frequency of the input means and can therefore be relied on for accurate control of output frequency.

The oscillatory system may comprise a spring e. g. a torsion bar or a plurality of bars, or a spiral spring loaded axially, or a leaf spring, and provided with means for varying the load applied by the spring thereby varying the torsional stiffness and the natural periodicity.

As an alternative construction the system may comprise one or more springs adjustable so as to act at a varying radius about the centre of a magnet constituting part of said electro-magnetic input means e. g. a spring may be anchored to a radial arm on the oscillatory system, and capable of being rotated about this anchorage so that the force will effectively act at a varying radius as aforesaid.

In a further construction the variation is effected by adjusting the axial load on one or more helical springs.

The oscillatory system may comprise a magnet mounted on a torsion bar and carrying an arm or like projecting means on which acts a spring in the direction of its swing about the torsion bar.

The invention will now be described by way of example with reference to the accompanying diagrammatic drawings wherein.

Figure 1:
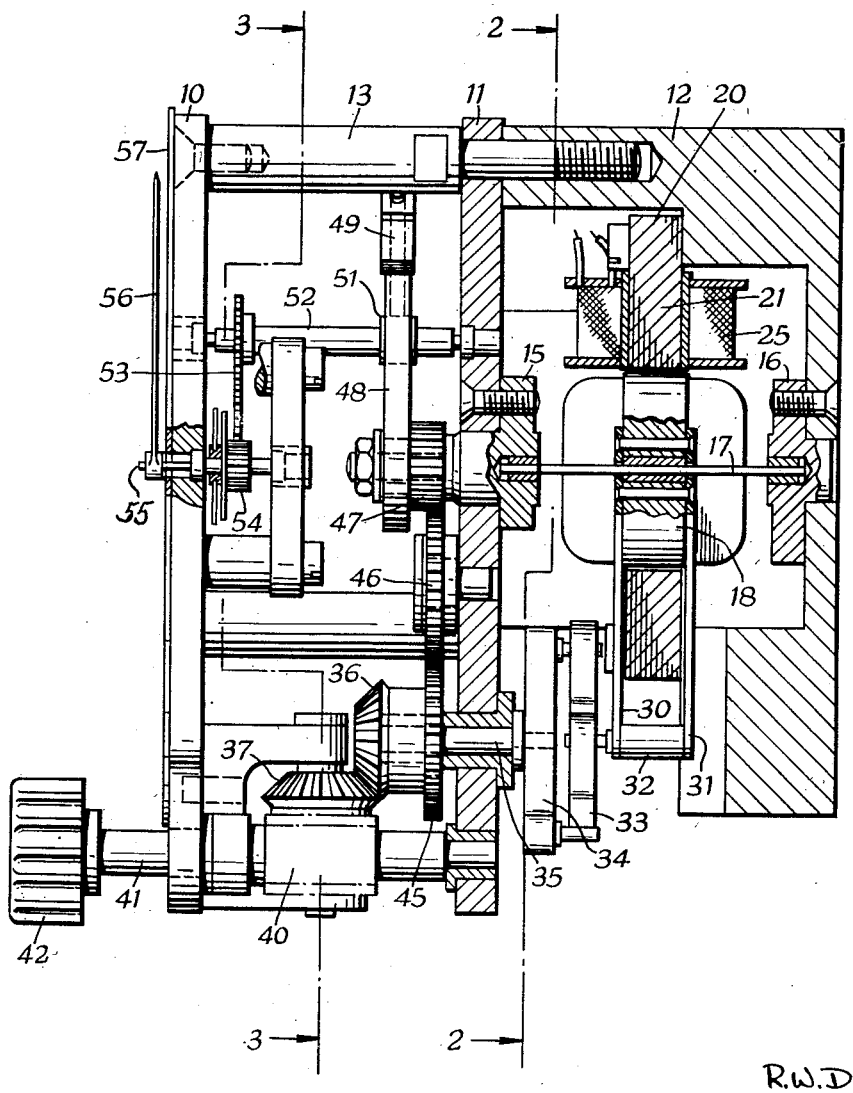
Figure 1 is a vertical sectional view of a device, suitable for use as an engine speed indicator, made in accordance with the invention.
Figure 2:
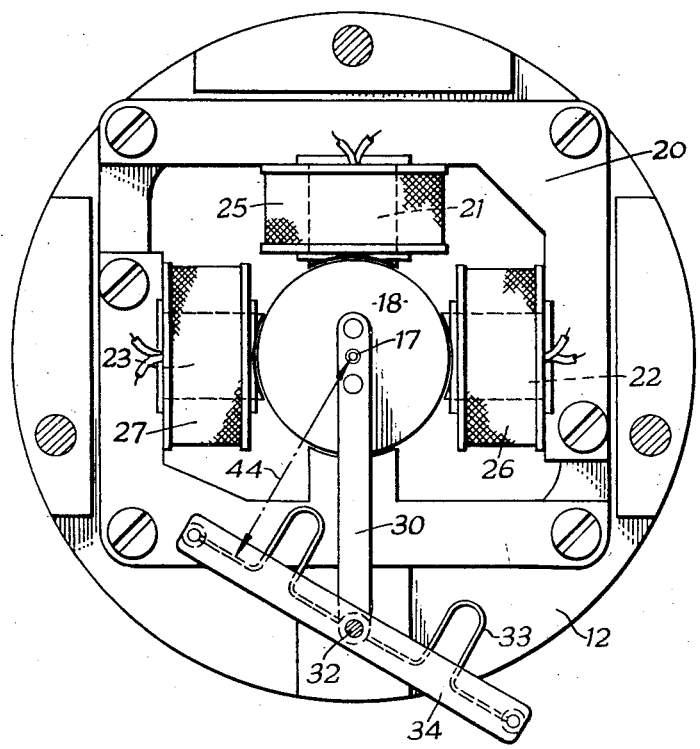
Figure 2 is a sectional view on the line 2—2 on Figure 1.
Figure 3:
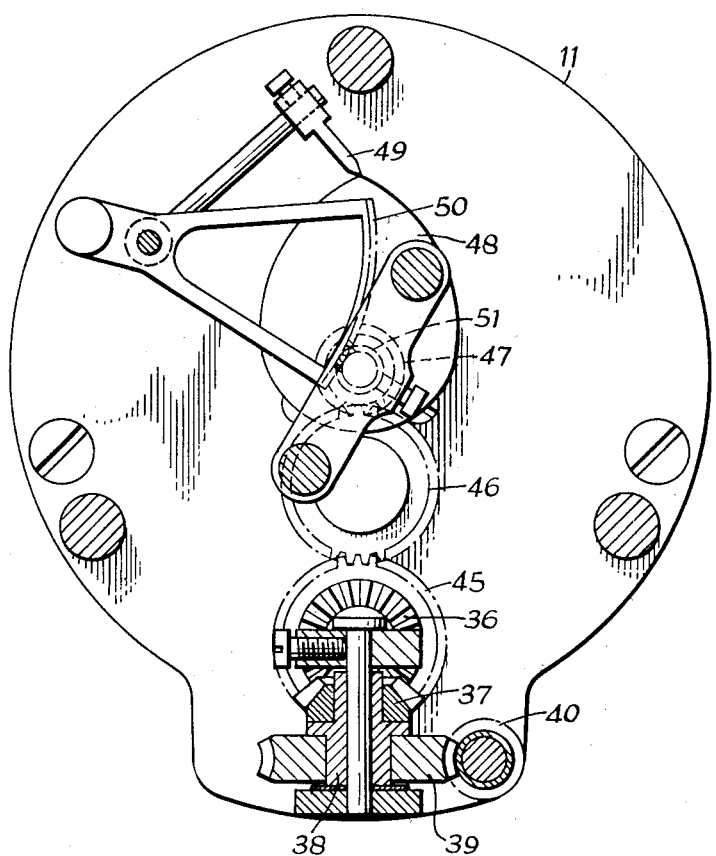
Figure 3 is a sectional view on the line 3—3 on Figure 1.

Referring first to Figures 1 to 3, three supporting walls 10, 11, 12 are spaced apart and connected together by screw members 13. The walls 11, 12 carry bearing blocks 15, 16 which carry a torsion bar 17 on which a permanent magnet 18 is fixed. The magnet is surrounded by laminations 20 which have inwardly extending parts 21, 22, 23 which carry respectively input or driving coils 25, 26, and an output or pick-up coil 27. The coils 25, 26 have their axes disposed at 90° to each other.

The magnet carries two arms 30, 31 that extend radially from the torsion bar 17, bridge over the laminations, are parallel to each other, and are connected together at their ends remote from the torsion bar by a member 32. The leaf spring 33 is anchored at its middle to the member 32 and is attached at its ends to a carrier 34. The spring is bulged between its anchorage and its ends. The carrier 34 is pivotally mounted on a spindle 35. The spindle 35 carries a bevel wheel 36 that meshes with a bevel wheel 37 that is carried by a sleeve 38 (Figure 3) on which a worm wheel 39 is mounted. The worm wheel is rotatable by a worm 40 which is fixed on a spindle 41, and the latter carries a knob 42 whereby the spindle can be rotated by the operator. This rotation adjusts the position of the spring around the anchorage 32 with corresponding adjustment of the effective radius 44 of the spring about the centre of oscillation of the magnet. The loading of the spring 33 on the arms 30, 31 in the direction of swing of the magnet is correspondingly varied with consequent variation of the natural periodicity of the oscillatory system constituted by the parts 17, 18, 30, 31, 33.

The adjustment applied by the operator is also applied to a pointer or other indicator. For this purpose the spindle 35 carries a gear wheel 45 in mesh with a pinion 46 that drives a pinion 47 on which is mounted a cam 48. This cam actuates a follower 49 that is carried by a gear segment 50 that meshes with a pinion 51 carried by a spindle 52 that also carries a gear wheel 53 in mesh with a pinion 54 disposed on a spindle 55 that carries a pointer 56 that co-operates with a dial 57 indicating engine speed.

The scale on the dial shows equal angular divisions for equal increments of frequency. The shape of the cam is designed accordingly and depends on the rate of change of spring rate curve of the spring.

It would be desirable where ambient temperature fluctuations are relatively large either to temperature control the case in which the device is placed, or to manufacture the device from temperature insensitive material.

Figure 4:
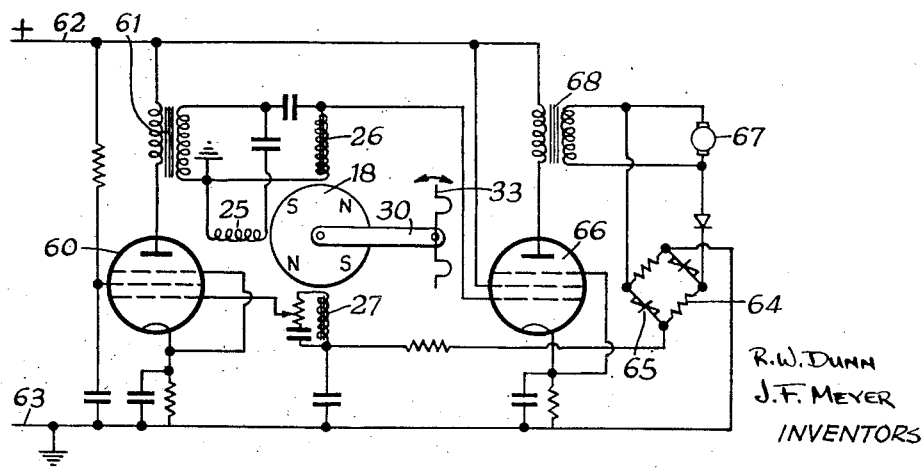
Figure 4 is an electrical diagram of a circuit for use with the device.

The coils 25, 26, 27 are connected in an electrical circuit. A suitable two stage circuit is shown in Figure 4. The first stage may be considered typical for any vibrator which is self-maintained regardless of frequency range. The second stage may be altered or extended to suit different instrument presentations.

A miniature variable-$\mu$ pentode valve 60 operates the vibrator by means of a transformer 61 in its anode circuit which is connected to the two drive coils 25, 26 one of which is tuned to a frequency near the bottom of the range, the other to one near the top of the range. When the supply volts are switched on (e. g. 250 volts D. C. across the input leads 62, 63) current flows through the valve 60 inducing volts in the transformer secondary which energises the vibrator coils causing the magnet to deflect and therefore induces volts in the pick-up coil 27. The pick-up coil is so wound that the polarity of its output tends to swing the grid of the valve 60 negative, thereby cutting down the flow of current through the valve and allowing the magnet to swing back. Thus is initiated the oscillatory process which is maintained at a frequency which for a simple vibrating system is the one at which maximum amplitude occurs, i. e. the natural frequency.

However, change of supply volts and slight internal variations may cause variation of the output volts and therefore the natural frequency, so an automatic gain or volume control is provided. A "Metrosil" bridge 64 is connected to the rectified output of a second valve 66 which is operated by the output transformer 61. The "Metrosil" bridge has an element of "Metrosil" which has the property of having a resistance with a non-linear volt-ampere characteristic. The bridge gives a voltage whose polarity and amplitude depends on the voltage output of its transformer, and therefore if the pick-up coil is connected to the bridge so that it is biased by the bridge unbalance volts, the bias may be arranged to compensate for the change in supply volts. Other forms of automatic volume control circuit employing "Metrosil" discs may be used.

As previously mentioned, valve 60 operates valve 66, the latter being an output pentode capable of driving an electric motor 67 via transformer 68. The motor may form the frequency standard side of a mechanical differential gear which is also driven by an engine the speed of which is to be measured.

Figure 5:
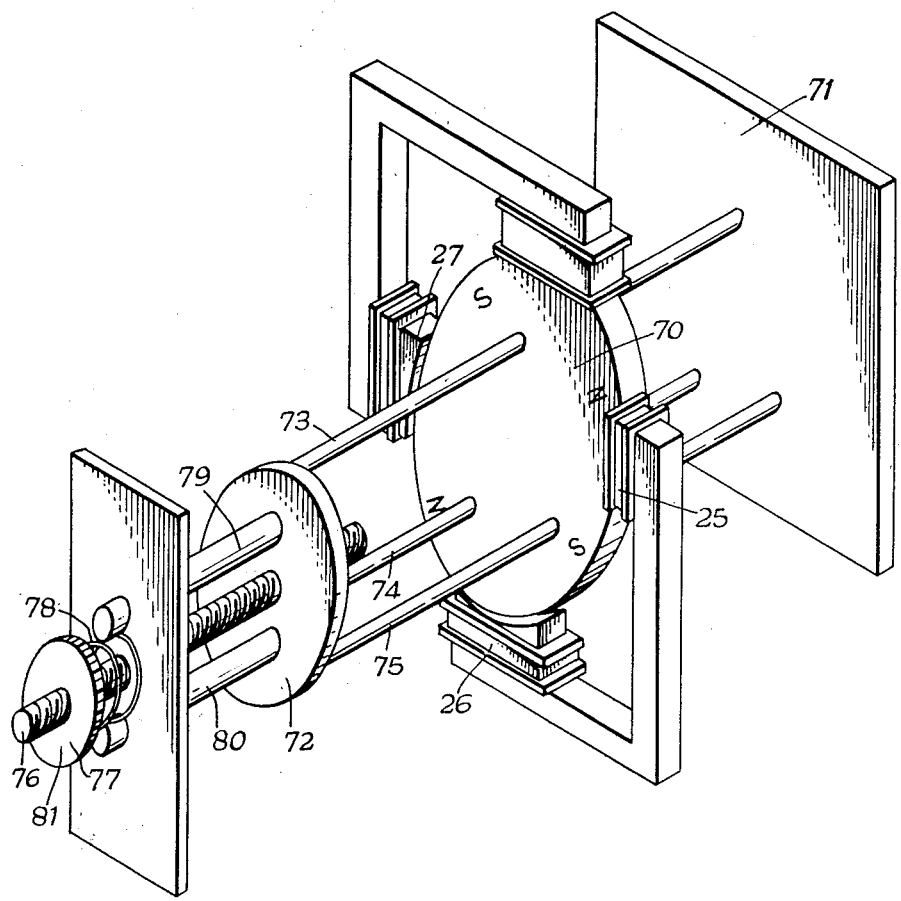
Figure 5 is a perspective view of a modified construction of the device.

The modified construction shown in Figure 5 comprises a magnetic disc 70 supported centrally between a rigid mounting plate 71 and a movable mounting 72 by three steel wires 73, 74, 75 equally spaced and passing through the disc parallel to its axis. The wires are suitably anchored to the magnetic disc. The movable mounting plate 72 is adjustable axially relatively to the disc 70, but located so that it cannot rotate and thus enables the tension in the wires to be varied at will. The adjustment is effected by means of a threaded bar 76, nut 77, spring 78, and locating pins 79, 80 carried by a fixed mounting plate 81.

Figure 6:
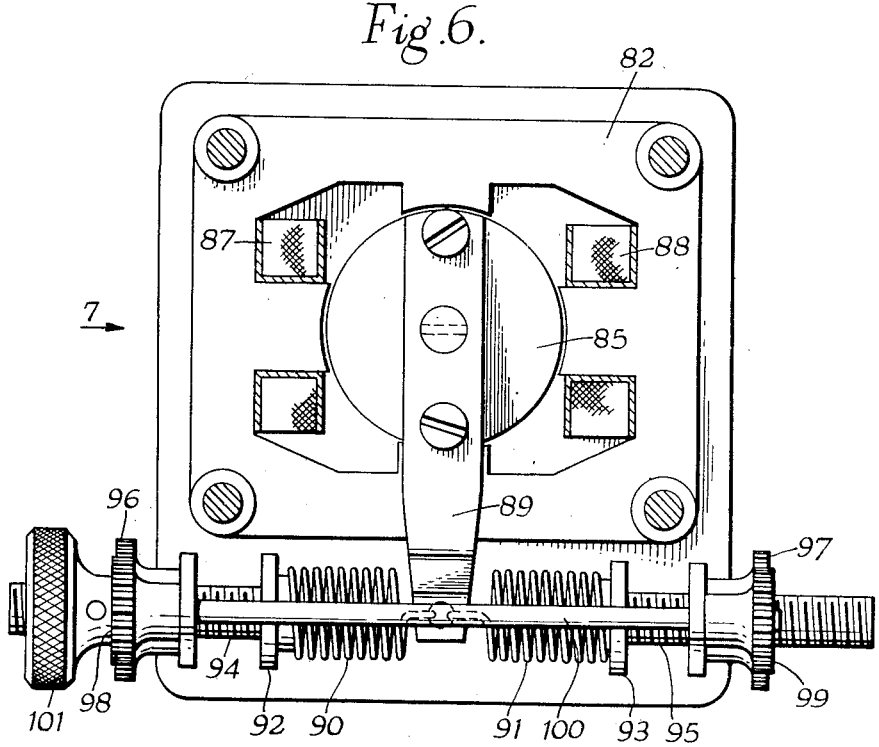
Figure 6 is an elevational view of a further modified construction.
Figure 7:
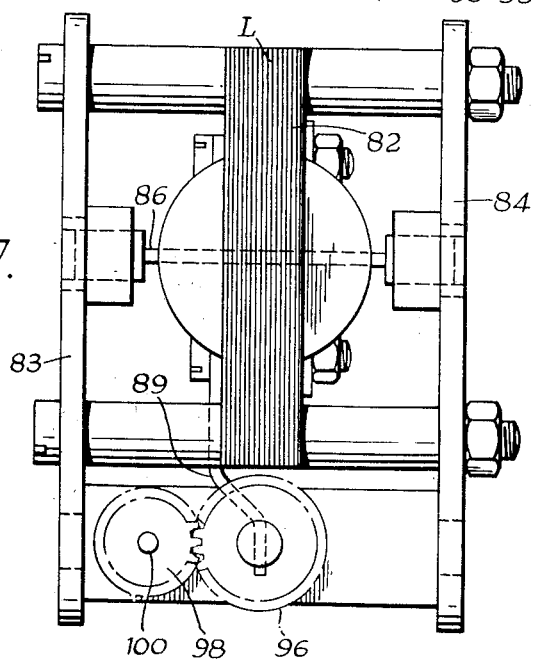
Figure 7 is a side elevation looking in the direction of the arrow 7 on Figure 1.

The further alternative construction shown in Figures 6 and 7 comprises laminations 82, clamped centrally between two spaced side plates 83, 84, and permanent magnet 85 is mounted at the middle of a torsion bar 86 that is clamped at its ends to the side plates. The laminations have four poles on two of which are placed two coils 87, 88. One of the coils constitutes input means and is in the anode circuit of a valve maintaining circuit, while the other has an alternating voltage induced in it by the magnet oscillations and is in the grid circuit of the same valve maintaining circuit, so that the oscillations are self-maintained at the natural frequency of the oscillatory system.

An arm 89 is fixed to the magnet and the end of the arm is attached to the adjacent ends of a pair of coaxial helical springs 90, 91 of equal strength and dimensions. The outer ends of these springs carry nuts 92, 93 engaged on threaded bars 94, 95 which can be rotated by gear wheels 96, 97 thereon in mesh with toothed wheels 98, 99 mounted on a common shaft 100 that carries a knurled knob 101 whereby the operator can move the nuts towards or away from each other to adjust the compression of the springs and thereby vary the natural frequency of the oscillatory system constituted by the torsion bar, magnet, arm, and springs. Shaft 100 is journaled in the two projecting plates shown in Figure 6 at the ends thereof, which also carry the assembly of parts 91—101.

Instead of a circular magnet, we may use a magnet of other form e. g. a pendulum type magnet. Also other forms of springs may be used. A further alternative method of varying the natural frequency of the system is by varying the number of coils in action of a spring e. g. by a thread fitting closely inside or outside the spring and movable along its length, or by a plate interposed between two coils and normal to the spring axis, the plate being so shaped as to contact the front face of one coil and being movable along the spring length. In either case only the coils between the magnet arm and the first groove on the adjusting thread will be effective, the spring rate therefore being proportional to the number of coils.

The unit referred to above very closely resembles the structure of Figures 6 and 7 except that springs 90 and 91 are fitted to mandrels mounted directly on gear wheels 96 and 97, thus dispensing with nuts and screws 92—95. These mandrels are of cylindrical form, with a helical groove substantially the same pitch as the springs, which screw into the spring, thereby changing the number of available spring coils and the rate of the spring at will. Rotation of the gears 96 and 97 effect this equally on both sides by rotation of the knob 101.

The torsion bar may be round, flat strip, or of other cross-sectional shape or may be replaced by a helical spring, or a series of bars or wires.

We claim:

1. A frequency controlling or indicating device comprising a resilient mechanical oscillatory system, said oscillatory system including a magnet mounted on a torsion support, means projecting radially from the magnet, and spring means applying a resilient loading on said projecting means at a radial distance from said torsion support and in the direction of oscillation, electro-magnetic input means for maintaining said system in oscillation, output means deriving an alternating electric current the alternations of which are controlled by the oscillations of said system, and adjusting means for changing the position of said spring means whereby the natural periodicity of the system may be varied over a given range.

2. A device as claimed in claim 1 wherein the said spring means is anchored to said projecting means, said adjusting means comprising means for selectively moving said spring means rotatably about its anchorage thereby to vary the effective radius of the spring from said torsion means.

3. A device as claimed in claim 2 wherein the spring means comprises a leaf spring anchored between its ends to said projecting means and connected at its ends to a bar which is rotatably adjustable by said adjusting means.

4. A device as claimed in claim 3 wherein the spring is bulged between its anchorage and each of its ends.

5. A device as claimed in claim 2 wherein said spring means actuates a cam device for transmitting movement to an indicator.

6. A device as claimed in claim 1 wherein the said input means comprises at least one coil carried by laminations surrounding said magnet, and said output means comprises a further coil carried by the same laminations.

7. A device as claimed in claim 6 wherein the input means comprises two coils fed with oscillating current and tuned to different frequencies.

8. A device as claimed in claim 7 having an electric circuit incorporating said coils, said circuit including a variable-$\mu$ pentode valve feeding the input coils via a transformer in its anode circuit, said output coil being wound so that the polarity of its output tends to swing the valve grid negative.

9. A device as claimed in claim 8 wherein the valve output drives a second valve part of the output of which is fed via a transformer to a bridge device which derives a voltage whose polarity and amplitude depends on the voltage output of the last mentioned transformer, and the output coil is connected to the bridge device so as to be biased by the bridge unbalance volts whereby the bias compensates for the change in supply volts, said second valve being an output pentode which drives an electric motor which forms the frequency standard of a mechanical differential.

10. A device as claimed in claim 1 wherein the spring means comprises a pair of helical springs fixed at their inner ends to said projecting means, and fixed at their outer ends to collars which are threaded on a screw threaded bar which is rotatably adjustable.

11. An electro-mechanical oscillator device comprising a permanent magnet fixed on a torsional support, means projecting from the magnet, and spring means applying a resilient loading on said projecting means at some radial distance from said torsional support, said magnet, support and spring means comprising a resilient mechanical vibrator system; electro-magnetic input means for maintaining said system in oscillation, output means deriving from the system an alternating electric current the frequency of which is determined by that of said system, and means whereby an operator can adjust the spring means so as to vary the natural periodicity of the system over a given range.

12. A device as claimed in claim 11 wherein the spring means comprises a spring pivotally anchored between its ends to said projecting means and connected at its ends to said adjusting means whereby its inclination is varied in relation to the direction of oscillation of the pivotal anchorage.

13. A device as claimed in claim 12 wherein the spring is a leaf spring and is bulged between its anchorage and each of its ends.

14. A device as claimed in claim 11 wherein said adjusting means actuates a cam device for transmitting movement to an indicator.

References Cited in the file of this patent

UNITED STATES PATENTS

| | | |
|---|---|---|
| 2,260,847 | Warren | Oct. 28, 1941 |
| 2,412,536 | Rieber | Dec. 10, 1946 |